United States Patent [19]

Small et al.

[11] 4,015,123

[45] Mar. 29, 1977

[54] SYSTEM FOR ASSURING HOT FACE IDENTIFICATION OF REFRACTORY KILN LINERS

[75] Inventors: John F. Small, Dover; Richard J. Shaffer, York, both of Pa.

[73] Assignee: Dolomite Brick Corporation of America, York, Pa.

[22] Filed: Nov. 6, 1975

[21] Appl. No.: 629,419

[52] U.S. Cl. .................. 250/223 R; 250/222 R; 250/562
[51] Int. Cl.² ........................................ G01D 21/04
[58] Field of Search .......... 250/223 R, 223 B, 562, 250/563, 572, 561, 222; 209/111.7

[56] References Cited

UNITED STATES PATENTS

| | | | |
|---|---|---|---|
| 3,289,808 | 12/1966 | Simmons | 250/223 X |
| 3,415,433 | 12/1968 | Shaw, Jr. | 356/209 X |
| 3,498,039 | 3/1970 | Kent et al. | 250/571 X |
| 3,566,135 | 2/1971 | Mouchart | 250/223 X |
| 3,759,620 | 9/1973 | Cushing et al. | 250/562 X |

*Primary Examiner*—David C. Nelms
*Attorney, Agent, or Firm*—Bacon & Thomas

[57] ABSTRACT

A system for assuring the proper identification of the hot face portion of a kiln liner or brick wherein the brick is supported and moved along a horizontal path in a specific physical orientation. A first sensing device serves to ascertain the orientation of the brick which, if correct, permits the brick to pass to a station at which point the brick receives an identifying paint mark or other identifying mark or label on its hot face portion. The marked brick then passes to a second sensing device which ascertains that the hot face has been properly identified.

10 Claims, 5 Drawing Figures

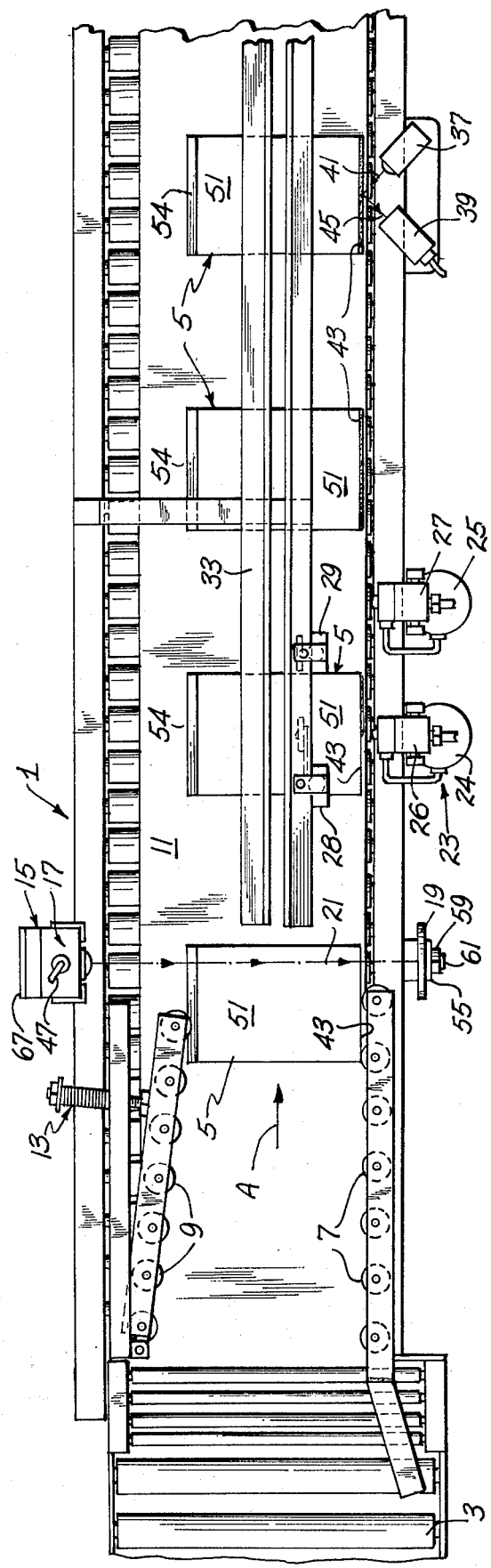

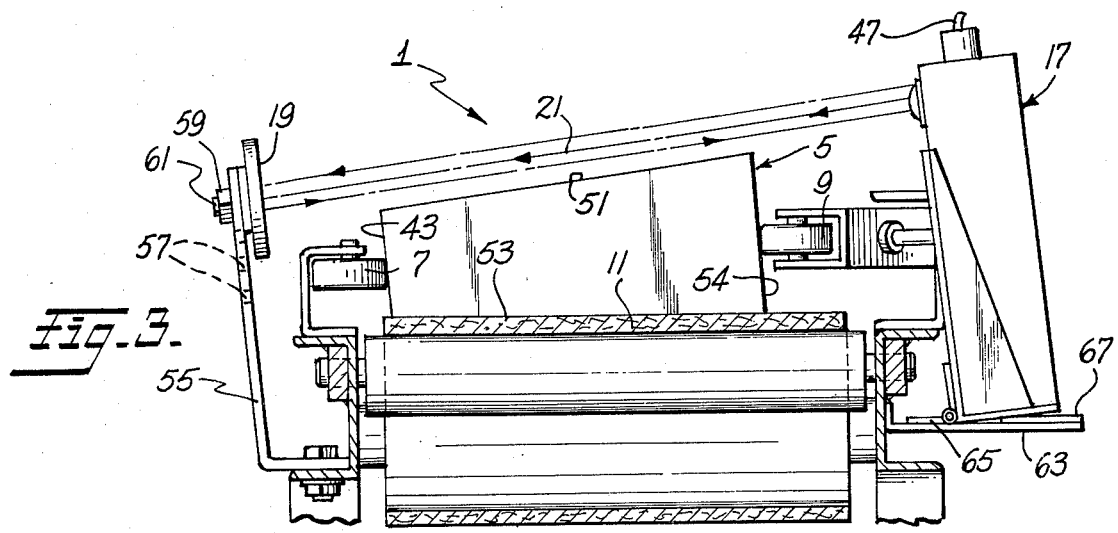
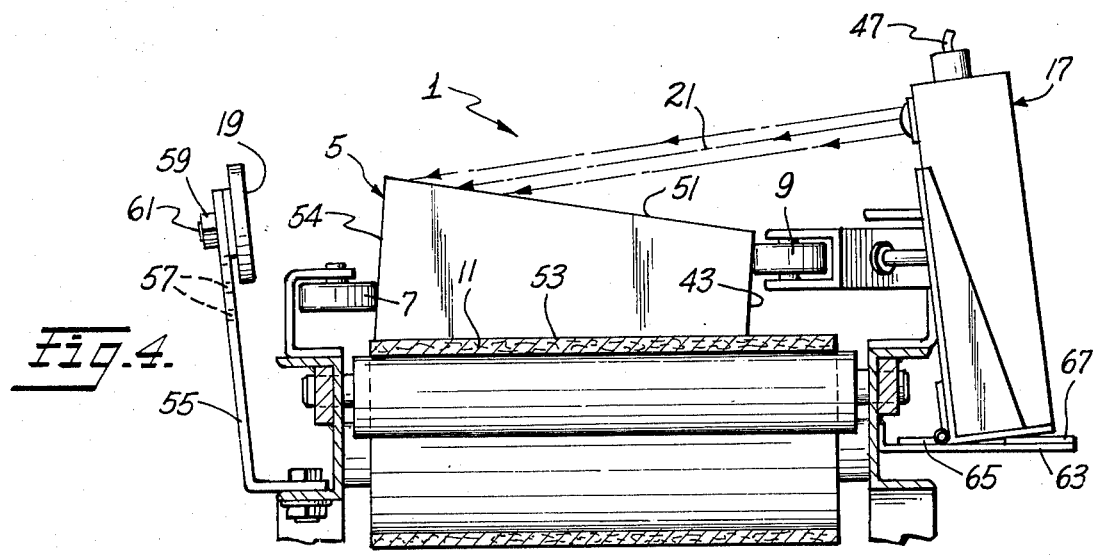
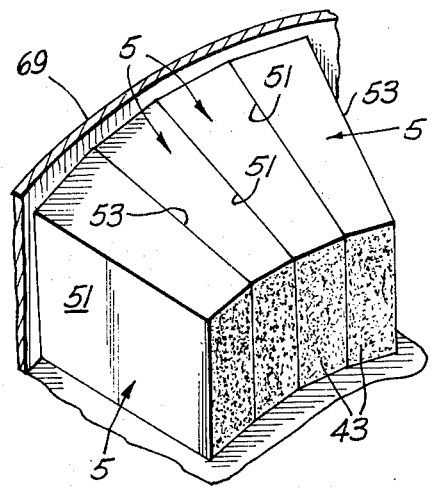

SYSTEM FOR ASSURING HOT FACE IDENTIFICATION OF REFRACTORY KILN LINERS

BACKGROUND OF THE INVENTION

1. Field of the Invention

The present invention relates generally to the identification of a specific portion of a given article with an identifying mark. More particularly, the invention relates to a method and means for the application of a color mark or label to a specific portion of an article, such as to the hot face of a kiln brick or liner, as such article is being conveyed along an assembly line.

2. Description of the Prior Art

In the manufacture of refractory liners, hereinafter designated as bricks, for use in lining kilns, furnaces and related apparatus, it is important that the specific portion or face of each brick ultimately exposed to the interior of the kiln, commonly known in the art as the "hot face", be readily apparent to the workman to facilitate the proper positioning of the brick in the kiln lining. Such bricks are normally provided with two tapered faces so that the overall configuration is somewhat wedge-shaped. However, since the taper is small compared with the overall dimensions of the brick, the hot face is not readily distinguishable from the opposite or cold face. Since kilns and furnaces are of a generally cylindrical configuration, a full lining therein requires that a plurality of circular rows of the bricks be placed against the interior surface thereof. The wedge-shaped configuration of each brick permits each such row of bricks to assume the required circular or ring configuration. If the bricks are correctly set in place within the furnace, the portions of the bricks exposed to the interior of the furnace will be the hot faces. Thus, by utilizing a hot face designation for each brick, it is assured that the bricks will be correctly set in place according to their wedge-shapes to form the circular furnace lining.

While the correct lining of any furnace is important for its proper operation and longevity, it is of even greater importance in the case of rotary furnaces or kilns because such furnaces are normally horizontal or inclined during use and their rotational motions tend to impart greater stresses to the furnace liner than would be experienced in the static or vertically oriented furnaces. Accordingly, if one refractory liner or brick is improperly set in place in a rotary kiln, an entire ring or circular layer of bricks could fail once rotation of the kiln commences.

Therefore, in order to assure the kiln liners or bricks are properly set in place within a furnace according to their wedge-shaped configuration, it is critical that the portions of the bricks which face the interior of the furnace and known as the hot faces be unmistakeably, marked, coded or designated as such during the manufacturing of the bricks. It has been proposed that the hot face portion of a kiln brick be so designated by painting the hot face portion a given color to not only indicate the hot face, but also to designate the specific type of brick by refractory composition. Accordingly, different colors can be utilized for the several varieties of refractory compositions, i.e. yellow for fired dolomite bricks, orange for tempered or resin-bonded dolomite bricks and green for 90% or higher concentration of burned or impregnated magnesite bricks.

Since kiln liners or bricks are normally manufactured at a relatively high production rate while utilizing both mechanical and manual manipulations and procedures, there is always a possibility of production errors. The known prior art techniques for accomplishing these procedures have been primarily based upon application of paint to the face thought to be the hot face and visually inspecting the painted bricks for errors, flaws or rejects. Such known prior art methods and procedures are time consuming and uneconomical. Because of the considerable amount of reliance placed upon human consistency, it is apparent that these known methods are not without the possibility of errors and omissions.

SUMMARY OF THE INVENTION

It is therefore an object of the invention to provide a method and system for marking or coding articles, such as kiln liners and the like, which will substantially eliminate human error and assure the proper identification of a specific portion of the article. Another object of the invention is to provide a system for accurately ascertaining whether or not a moving article is in a desired physical orientation.

It is yet another object of the invention to provide a continuous moving system in which incorrect physical orientation of an article being processed will automatically stop movement of the system and in which inadequate processing will be automatically ascertained.

It is still yet another object of the invention to provide a system for coding or identifying the hot face of a kiln liner or brick moving in an assembly line wherein errors in such coding or identification are virtually eliminated.

The present invention serves to achieve these and other objects and, further, overcomes the difficulties and disadvantages inherent in known systems as previously described by providing an assembly line system in which an article, such as a kiln liner or brick, may be accurately and automatically tested for its physical orientation, automatically provided with a coating of paint on a specific portion thereof and automatically tested to ascertain the presence of paint on the specific portion painted. This is achieved by locating a first sensing means, in the form of photoelectric means or similar device, adjacent a conveyor supporting and moving the brick, whereby the scan line of the sensing means is disposed adjacent and parallel to one side of the brick such that any misorientation of the brick will cause an interruption of the scan line, thereby providing indication of the misorientation. In the event the brick is properly oriented, it is then passed by the moving conveyor to a paint application station during which a coating of paint having a desired color is applied to the hot face in order to code or identify that specific portion or face. The painted brick is then passed through a second sensing means, in the form of photoelectric means or similar device located adjacent the conveyor, whereby the presence of an adequate concentration of paint on the desired specific portion or hot face of the brick is ascertained by virtue of the difference in light reflectivity between an unpainted hot face surface and a painted hot face surface. The first and second sensing means may be connected to the power supply for moving the brick for the purpose of shutting the latter off in the event that the article is incorrectly oriented and/or insufficiently painted.

These and other objects and advantages of the present invention will be apparent from the following description and appended claims, reference being made to the accompanying drawings forming a part of the specification wherein like reference characters designate corresponding parts of the several views.

BRIEF DESCRIPTION OF THE DRAWINGS

FIG. 1 is a fragmentary plan view showing kiln liners or bricks being processed according to the system of the invention;

FIG. 2 is a fragmentary side elevational view of the system of FIG. 1;

FIG. 3 is an enlarged fragmentary transverse sectional view, taken along the line 3—3 of FIG. 2 showing a kiln liner or brick (with substantial taper being shown for clarity of illustration) in its correct physical orientation and being tested for orientation by the first sensing means of the invention;

FIG. 4 is a view, similar to FIG. 3, but showing the kiln liner or brick of FIG. 3 in an incorrect physical orientation which is being sensed by the first sensing means of the invention; and FIG. 5 is a fragmentary perspective view of a series of kiln liners or bricks which have passed through the assembly line of the invention, the bricks being shown in their normal assembled position as a portion of a ring or circular tier forming the lining of a rotary furnace.

DETAILED DESCRIPTION OF THE PREFERRED EMBODIMENT

As seen in FIGS. 1 and 2, the invention comprises an assembly line system 1 which may form a portion of an overall system (not shown) utilized for the manufacture of kiln liners or bricks of various refractory compositions. System 1 includes a roller conveyor 3 for receiving a line of bricks 5 which have been previously molded and subjected to other treatments. A series of fixed vertical rollers 7 may be utilized in conjunction with a series of adjustable vertical rollers 9 for aligning each individual brick 5 on a belt conveyor 11 as it comes off of roller conveyor 3. Vertical rollers 9 may be transversely adjusted with respect to belt conveyor 11 by means of a spring-biased nut and bolt arrangement 13 or any other similar means well known in the art and deemed suitable for the same function. The bricks 5 are normally placed on conveyor 11 with one of the tapered sides down and with the hot face in contact with rollers 7.

As brick 5 progresses along belt conveyor 11 in the direction indicated by arrow A, it initially arrives at a first sensing means 15 which may be in the form of a photoelectric cell and detector or similar device such as a reflux photoelectric control relay 17 and a retro-reflector 19 disposed directly opposite therefrom. The field of prior art relating to photoelectric cells and detectors and related systems is extremely active and well known. Such systems may include an emitter and receiver in separate or single units that is utilized in conjunction with a separate reflector spaced therefrom to thereby provide a scan line or light beam which, if interrupted, will actuate a signal or alarm to this effect. Devices of this nature deemed suitable for the practice of the present invention are well exemplified by the U.S. Pats. to Lauterbach No. 2,366,152, Hunter No. 3,071,711 and Mouchard No. 3,566,135, the complete disclosures of these patents being herewith incorporated by reference thereto. One aspect of the invention relates to the manner in which the scan line or light beam of the known devices is arranged and utilized in the particular combination of the disclosed system.

As seen in FIG. 1, relay 17 and retro-reflector 19 are located on opposite sides of belt conveyor 11 such that a scan line or light beam 21 may be passed therebetween across the path in which bricks 5 must travel in the direction designated by arrow A. After successfully passing first sensing means 15, brick 5 then arrives at a painting station indicated generally at 23.

Painting station 23 may comprise an automatic or manual paint applicator system. For example, an automatic system may include a pair of paint supply reservoirs 24 and 25 which feed their respective paint supplies to a pair of spray guns 26 and 27. A pair of microswitches 28 and 29, provided with brick contact rollers 30 and 31, respectively, are utilized to automatically activate and deactivate a control circuit (not shown) for spray gun 26. A similar microswitch arrangement (not shown) may be utilized for spray gun 27. Microswitches 28 and 29 are supported for adjustment along the length of an overhead beam 33 to permit compensation for varying sizes of bricks 5. Normally only one spray gun, such as 26, would be used at a time. However, the disclosed dual system serves to reduce delays encountered in refilling reservoirs 24 and 25 or changing from one color to another.

After leaving painting station 23, brick 5 then travels along belt conveyor 11 until it arrives at a second sensing means 35 which may comprise a photoelectric detector that includes an emitter or sender unit 37 operating in conjunction with a separate receiver unit 39. As more clearly seen in FIG. 1, a scan line or light beam 41 originating from emitter unit 37 is caused to reflect off of a hot face 43 of brick 5 such that a reflected beam 45 is received by receiver unit 39. The degree of reflectivity based upon the color of hot face 43 is ascertained by unit 39. As is apparent, an unpainted hot face 43 will provide a reflected signal that is different from a painted hot face 43. Second sensing means 35 may comprise any photoelectric detector well known in the prior art and deemed suitable for detecting differentiations in reflectivity between articles of different colors. The use of photodetectors for color sorting or color differentiation is well known and such devices of this nature and suitable for the practice of the present invention are well exemplified by the U.S. Pats. to Bickley No. 2,675,488, Fraenkel No. 3,066,797 and Roberts, Jr. et al No. 3,206,022, the complete disclosures of these patents being herewith incorporated by reference thereto. Another aspect of the invention involves the special arrangement and use of the known devices in the combination disclosed herein.

First sensing means 15 may be connected through a first line 47 to an alarm (not shown) or similar device for providing indication of an incorrectly oriented brick 5. Preferably, first line 47 may be connected to a switch in the power source driving belt conveyor 11 so that the latter will be automatically stopped upon the detection of an incorrectly oriented brick by first sensing means 15. Similarly, second sensing means 35 may be provided with a second connection line 49 that may also be in electrical circuitry with an alarm (not shown) or similar means for providing indication of an insufficiently painted or unpainted brick. Preferably, however, second line 49 may also be connected to a switch in the power supply (not shown) of belt conveyor 11 so that the latter may be stopped when a painting error or omission in the hot face 43 of brick 5 is detected.

Referring more particularly to FIGS. 3 and 4, the manner in which first sensing means 15 is arranged to detect an incorrect physical orientation of brick 5 moving along belt conveyor 11 shall now be described in detail. In the general overall system for manufacturing kiln liners or bricks 5, the bricks 5 are placed manually or mechanically on roller conveyor 3 for feed into system 1. As is apparent from FIG. 3, brick 5 has a wedge-shaped configuration defined by a pair of opposing inclined faces 51 and 53 which converge to form hot face 43. Directly opposite hot face 43 is a cold face 54. When a plurality of bricks 5 are arranged in rings or circular tiers within a furnace to form the lining thereof (as shown in FIG. 5) hot faces 43 must be positioned to form the only portions of bricks 5 exposed to the interior of the furnace. In this way, opposing inclined faces 51 and 53 will be disposed in parallel with the corresponding inclined faces of adjacent bricks and cold faces 54 will face the furnace wall, to thereby form a circular configuration.

As bricks 5 are moved by belt conveyor 11 in the direction indicated by arrow A (FIG. 1), they should rest on one of the inclined sides with hot face 43 on the side toward painting station 23. This correct orientation of brick 5 is shown in FIG. 3 as it passes through first sensing means 15. In its correct orientation, scan line 21 produced by emitter and receiver unit 17 is passed directly adjacent and parallel to uppermost inclined surface 51 of brick 5 without interruption to retro-reflector 19 which sends the scan line back to unit 17. Because of different specified sizes of different batches of bricks 5 to be processed, it is desirable to mount retro-reflector 19 on a support 55 in such a manner that reflector 19 can be substantially vertically adjusted with respect thereto. For example, a plurality of holes 57 may be provided along the length of support 55 so that reflector 19 may be positioned in any selected hole and secured therein by means of a nut 59 and a bolt 61 or similar such connection means. Unit 17 may also be adjusted to compensate for differences in the taper of different batches of bricks by pivotally mounting unit 17 to a horizontal support 63 through a hinge 65 and providing means, such as shims 67, to control the angular disposition of scan line 21 produced by unit 17. Optionally, unit 17 may also be mounted for vertical adjustment in a manner similar to that shown for retro-reflector 19.

In a typical application of the system of the invention, the refractory kiln liners being scanned may have a cold face to hot face variation of as little as one-eighth inch and as great as 1⅛ inch depending on specifications for different batches. With refractory lengths ranging from 6 to 12, the angle of the scan line 21 to the horizontal may be varied from 0° 30' to 10° to accomodate different batches. For most tapers, placing the unit 17 and support 55 at an angle of 95° with respect to the horizontal is adequate, but the removing or the installing of shims 67 on one end of the unit 17 can correct for gross or minimal tapers. Processing of refractory kiln liners or bricks having a common cold face thickness and a common taper require only an initial adjustment. When kiln liners having a different than previous cold face thickness or taper are processed, readjustment is readily accomplished by the means shown.

In the event brick 5 has been incorrectly oriented on belt conveyor 11, as depicted in FIG. 4, scan line 21 will be interrupted by a surface, such as 51, of brick 5. Indication of this incorrect orientation is provided through first line 47 either to an alarm (not shown) or to the shunting off of the power supply (not shown) to belt conveyor 11.

MODE OF OPERATION

The manner in which system 1 of the invention operates to assure the correct painting of hot face 43 of brick 5 will now be described. After being molded and subjected to various preliminary treatments, e.g. for attachment of side spacers (not shown) brick 5 is placed upon roller conveyor 3 from which it is sent to moving belt conveyor 11 and horizontally aligned thereon by means of vertical rollers 7 and 9. It is, of course, assumed at this stage that brick 5 has been previously correctly oriented prior to its arrival on moving belt conveyor 11 so that hot face 43 is directed properly for painting. This correct orientation is assured by first sensing means 15 and the scan line 21 produced thereby. If brick 5 is correctly oriented as shown in FIG. 3, scan line 21 being passed adjacent and parallel to inclined surface 51 will be uninterrupted by brick 5, in which event the latter will be moved by belt conveyor 11 to paint station 23. However, in the event brick 5 is misoriented as shown in FIG. 4, scan line 21 will be interrupted by inclined surface 51, thereby providing an indication of such misorientation either through an alarm or the shutting off of the power supply to belt conveyor 11 by means of electrical connection through line 47. The operator may then remove or correct the orientation of brick 5 so that the assembly line system can continue operation.

A correctly oriented brick 5 then passes to paint station 23 at which point hot face 43 is automatically provided with a coating of paint having a desired color. Subsequent to paint station 23, brick 5 then travels along belt conveyor 11 to second sensing means 35. At this point, scan line 41 produced by emitter unit 37 is caused to be reflected off of hot face 43 and received as reflected beam 45 by receiver unit 39. Second sensing means 35 is adjusted to account for the difference in light reflectivity between unpainted hot face 43 and hot face painted with a desired color shade. Should second sensing means 35 detect that hot face 43 has, in fact, been insufficiently or not painted at all, indication of this condition is then provided through an alarm or the shutting off of the power means operating belt conveyor 11 through electrical connection 49. The operator then takes appropriate action to correct the problem. However, a brick with a correctly painted hot face 43 will be permitted to pass through since the degree of reflectivity of the painted surface will be considered acceptable by second sensing means 35. The complete assembly line usually will include other stations (not shown) such as stations for affixing spacers, steel plates and the like to the bricks. The proper orientation of the brick on the moving belt also facilitates the operation of these stations.

The basic manner in which bricks 5 are installed within a kiln or furnace to form a lining is shown in FIG. 5 The kiln or furnace wall is generally of a cylindrical configuration. Bricks 5 are utilized to line the interior of a kiln section wall 69 by disposing a plurality of such bricks together with their thick or cold face out and their smaller hot face toward the interior of the furnace. Because each hot face 43 of brick 5 has been coded or designated as such by the painting thereof, the possibility of error in forming a lining from the bricks is thereby minimized or eliminated altogether. The finished lining will be such that only hot face 43 of each brick 5 will be exposed to the interior of the fully lined furnace.

It is to be understood that the former of the invention herewith shown and described are to be taken as preferred examples of the same, and that various changes in the shape, size and arrangement of parts may be resorted to, without departing from the spirit of the invention or scope of the following claims.

What is claimed:

1. A system for placing an identifying mark on a specific surface portion of an irregular article, which system comprises, in combination: means for supporting and moving the article among a given route; a first sensing means positioned along said route for ascertaining if said specific surface portion of said irregular article is in the desired orientation for marking, by means of a scan line of detection positioned adjacent and parallel to the plane of a given side of the moving irregular article such that incorrect orientation of the article will be evidenced by interruption of the scan line of detection by the article; marking means positioned further along said route for applying an identifying mark to said specific surface portion of a properly oriented article; and a second sensing means positioned downstream from said marking means for ascertaining the presence of a sufficient identifying mark on the specific surface portion of said article.

2. The system of claim 1 wherein the marking means comprises means for applying paint onto the specific surface portion of the article.

3. The system of claim 1 wherein the means for supporting and moving the article includes a substantially horizontal conveyor.

4. The system of claim 1 wherein the first sensing means includes a photoelectric cell and relay.

5. The system of claim 3 wherein the article to be processed is a tapered furnace liner brick, the specific surface portion to be marked is the hot face of said brick and the scan line of detection is positioned above and transverse to said horizontal conveyor and adjacent and parallel to a tapered side of the brick when the brick is properly oriented on said conveyor.

6. The system of claim 1 wherein the marking means applies paint to the specific surface portion of the article and the second sensing system includes a photoelectric means that ascertains the presence of paint on the article by interpretation of the variation in light reflectivity between a painted article and an unpainted article.

7. In a system for placing an identifying mark on the hot face of a tapered refractory brick, wherein the refractory brick is placed resting on one tapered side on a horizontal conveyor so that the upward side lies in a plane which is inclined transverse to the direction of movement of the conveyor, means for determining that the refractory brick is properly placed on the conveyor with said hot face pointing in the desired direction, comprising: photoelectric means for establishing a light beam across said horizontal conveyor above and substantially parallel to said inclined plane of said upward side of said refractory brick when said brick is properly placed on said conveyor, said photoelectric means being arranged so that said light beam is closely spaced to said upward side, whereby if said refractory brick is reversed from its proper position said light beam will be interrupted by said refractory brick, said photoelectric means including means for detecting interruption of said light beam whereby improper placement of a brick on said conveyor will be detected.

8. The system of claim 7 wherein said photoelectric means are adjustable to position said light beam at selected distances above said horizontal conveyor and at selected angles to thereby accommodate brick of different dimensions.

9. A system for placing an identifying mark on the hot face of a tapered refractory brick, comprising: a horizontal conveyor for moving said brick along a horizontal route, said brick when in proper orientation on said conveyor lying on one of the tapered sides thereof with said hot face pointing outwardly toward a first lateral edge of said conveyor; a painting station positioned along said first lateral edge of said conveyor; photoelectric means positioned along said route ahead of said painting station for establishing a light beam across said horizontal conveyor at an incline corresponding to that of the path of the upper surface of a brick which has been placed on the conveyor with one tapered side down and the hot face in proper orientation pointing toward said first lateral edge of said conveyor, said photoelectric means being arranged so that said light beam is closely spaced to said inclined upper surface of a properly oriented brick so that if said brick is reversed said light beam will be interrupted, and including means for detecting interruption of said light beam by an improperly placed brick; means at said painting station for applying paint to the hot face of a properly placed brick moving thereby; and means located downstream from said painting station for automatically detecting an insufficiently painted brick hot face.

10. The system of claim 9 wherein said photoelectric means are adjustable to position said light beam at selected distances above said horizontal conveyor and at selected angles, to thereby accommodate brick of different dimensions and tapers, and wherein the means for detecting an insufficiently painted brick hot face includes a photoelectric means that ascertains the presence of paint on the hot face by interpretation of the variation in light reflectivity between a painted face and an unpainted face.

* * * * *